March 17, 1936.  C. A. CAMPBELL  2,034,328
AIR BRAKE
Filed Feb. 21, 1931
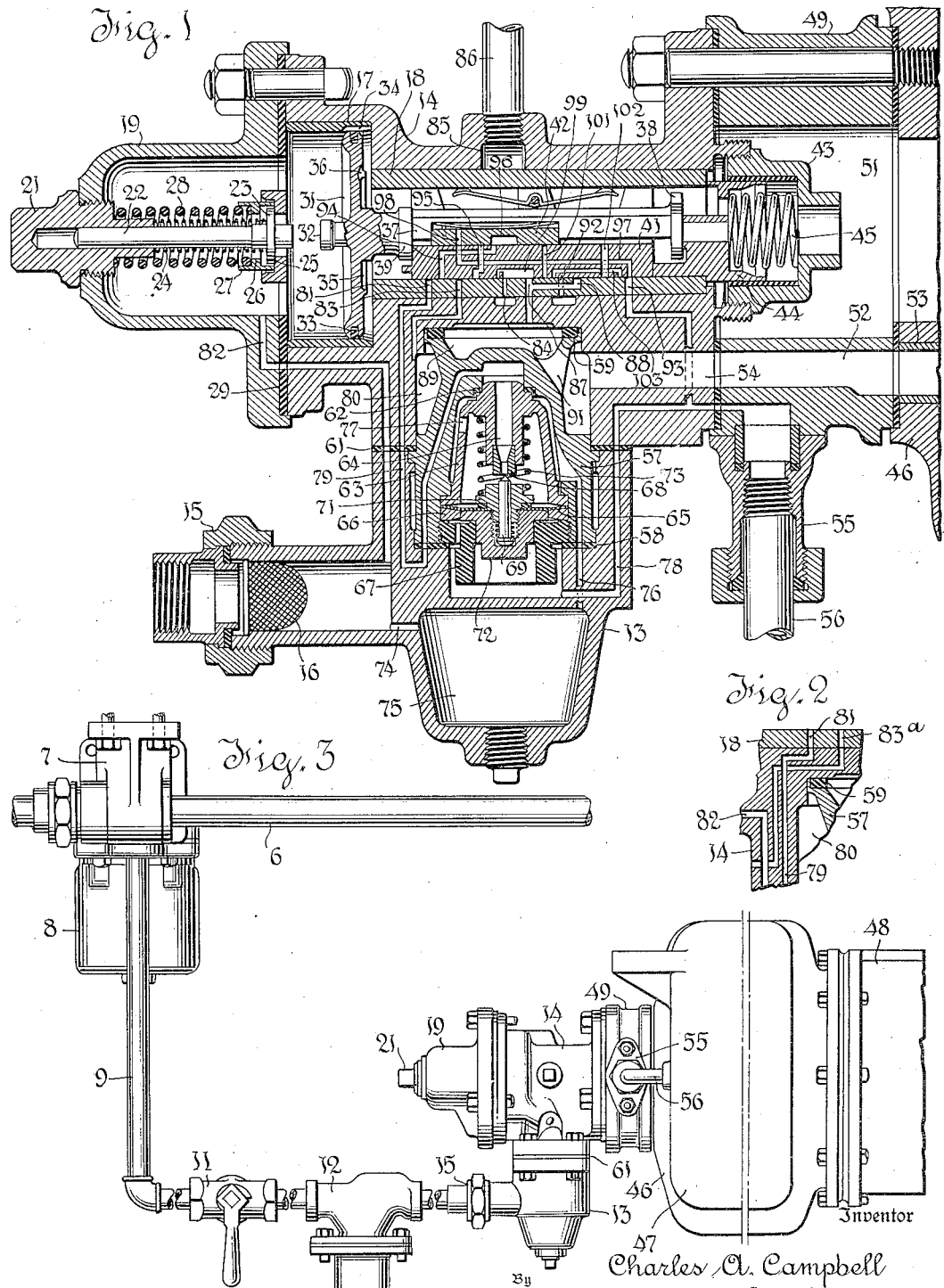
Inventor
Charles A. Campbell
By
Attorneys Patented Mar. 17, 1936

2,034,328

UNITED STATES PATENT OFFICE 2,034,328

AIR BRAKE

Charles A. Campbell, Watertown, N. Y., assignor to The New York Air Brake Company, a corporation of New Jersey Application February 21, 1931, Serial No. 517,606

25 Claims. (Cl. 303—38)

This invention relates to air brakes and particularly to triple valves of the so-called quick service type. Generally stated, a quick service triple valve functions as the triple valve moves toward service application position, to vent the brake pipe and thus accelerate the reduction of brake pipe pressure. The air is usually vented to the brake cylinder or to atmosphere.

In quick service triple valves, as heretofore designed, it has never been practicable to secure the full advantage theoretically attainable by the quick service principle. If the quick service vents were made large enough to propagate a service reduction rapidly, the triple valves became very unstable, so that a relatively slight brake pipe reduction initiated at the engineer's brake valve would, under certain conditions, result in full service applications.

To avoid this difficulty the obvious expedient was to reduce the capacity of the quick service vents and this was done in actual practice. While it reduced the sensitiveness of the valves and avoided the difficulty above outlined, it necessarily slowed the rate of propagation of service reductions through the length of the brake pipe and introduced another difficulty. As a result of the limited service venting in the well known K-type triple valve, this valve, as used today, develops undesirable characteristics in long trains. At the front and rear of a long train the quick service action is more pronounced than at the middle because of a sort of wave effect occasioned by forward flow in the brake pipe. Thus, as the triple valves respond serially toward the rear of the train, there is a pause at the middle of the train followed by rapid serial action at the rear. Consequently, the slack tends to run in at the middle of the train, after which the rapid application of the brakes at the rear end causes a reverse effect. Serious shocks result.

The purpose of the present invention is to temporarily suspend the action of the quick service vent, after it has functioned once to reduce brake pipe pressure. This prevents the venting action from synchronizing with and intensifying the wave action in the brake pipe, and makes it possible to use larger quick service vents and thus secure more rapid propagation of service applications to the end of the train. With larger vents there is no pause at the middle of long trains.

In its broadest aspects the invention involves secondary control of the vent passage by a pressure actuated valve which is urged in an opening direction by brake pipe pressure and is yieldingly urged in its closing direction, the parts being so arranged that reduction of brake pipe pressure a chosen amount, say six pounds per square inch, causes the valve to close. If the force urging the valve closed were substantially constant as it would be if exerted by a spring, the vent would be closed whenever the brake pipe pressure was the chosen amount (assumed to be six pounds per square inch) below normal. This would preclude quick service venting in some cases when it is desired; for example, if a service application were made during recharging of the reservoirs.

To ensure quick service venting in the initial reduction of any service brake pipe reduction, I so arrange the device that the valve is urged closed by fluid pressure which approximately equals brake pipe pressure in release and recharge but not in application positions. This result is secured by subjecting the abutment which operates the valve in a valve closing direction to pressure in a chamber or reservoir which is isolated and not drawn upon in service applications, but which in release and recharge position is connected more or less directly with the brake pipe, so that pressure in such chamber or reservoir approximately equalizes with the pressure in the brake pipe.

The desired result, and certain secondary advantages, are secured in connection with a triple valve controlling flow to the brake cylinder from two reservoirs, an auxiliary reservoir and a supplemental reservoir, the first of which alone is drawn upon in service applications, both being drawn upon in emergency. Pressure in the supplemental reservoir acts on the secondary control vent valve in a closing direction, and because the two reservoirs are connected together and are both being charged from the brake pipe in release and recharge position, quick service venting can take place at the start of a service application initiated during recharge.

Various other advantages will be apparent upon consideration of the preferred device now to be described.

In the drawing:—

Fig. 1 is a vertical axial section showing a triple valve embodying my invention.

Fig. 2 is a fragmentary section similar to a portion of Fig. 1 and showing a modification.

Fig. 3 is an elevation showing the brake pipe, emergency vent valve, triple valve, portions of the auxiliary and supplemental reservoirs and their connections.

The showing in Figs. 1 and 2 is diagrammatic as to the porting. These figures are drawn as if all the ports were in a single plane. It is possible to modify the porting slightly without changing its functions and in that way reduce the dimensions of the triple slide valve and simplify its manufacture.

Referring first to Fig. 3, a portion of the train pipe is indicated at 6. It will be understood that this train pipe is connected from car to car, as usual, and that the pressure in the train pipe is controlled by any suitable type of engineer's brake valve.

7 represents a combined bracket and chamber with which the brake pipe 6 communicates and upon which is mounted the brake pipe vent valve, indicated generally by the numeral 8. This brake pipe vent valve is of any suitable construction, and functions upon reduction of brake pipe pressure at an emergency rate to vent the brake pipe to atmosphere.

The triple valve here chosen for illustration has no means for venting the brake pipe in emergency, reliance being placed on the emergency vent valve 8, but the invention herein claimed is not limited to the use of triple valves of this particular type.

9 is a branch pipe connected with the member 7 and in communication with the brake pipe 6. It leads by way of the usual cut-out cock 11 and centrifugal dust collector 12, to the lower body portion 13 of the triple valve, whose main body portion is indicated at 14.

Referring now to all the figures, the connection of the branch pipe 9 with the lower body 13 of the triple valve, is made by means of a union 15, as usual. The customary strainer 16 is provided. The main body portion of the triple valve has the usual cylinder space, with cylinder bushing 17, and the usual valve chamber with valve chamber bushing 18. The front cap 19 is of a familiar form and is provided with a guide plug 21 which receives and guides the graduating stem 22. This stem is formed with a flange or collar 23 between which and the end of the plug 29 is confined a light graduating spring 24.

The collar 23 engages the seat 25. When the graduating stem 22 is forced back a short distance the flange 23 engages an inward extending flange 26 on the ring 27. This ring is normally held against a seat 25 by a second and relatively heavy graduating spring 28.

The plug 21 seals the opening in the cap 19 and a front cap gasket 29, of familiar form, seals the joint between the cap 19 and the body 14 and offers a seat for the triple piston 31.

The triple piston 31 is of the form used in the well known K-type triple valve and is provided with a graduating button 32 which engages the graduating stem 22. The piston 31 is provided with the usual piston ring 33, and in charging positions overtravels the feed groove 34, of familiar form, in the cylinder bushing 17. In restricted recharge position the bead 35, on the inner face of the piston 31, seats against the end of the valve chamber bushing 18 and thus restricts the charging flow to the capacity of the slender notch 36, which is cut in the bead 35.

The piston 31 has the usual rod or stem 37 with a guiding spider 38 at its inner end. Between the spider 38 and the collar 39 on stem 37, is the triple slide valve 41, the spacing of the spider 38 and collar 39 being such as to afford limited lost motion to the slide valve 41.

Closely confined in a notch in the stem 37 is the graduating valve 42. The slide valve 41 and the graduating valve 42 are held to their seats by bow springs, as usual, and these springs are visible in the drawing.

Threaded to the inner end of the body 14 is a guide cap 43 for the retard stop 44. This stop is urged outward by the retard stop spring 45, and unless spring 45 is compressed, retard stop 44 arrests the piston 32 and slide valve 41 in normal recharge and release positions.

The auxiliary reservoir is indicated at 46 and the supplemental reservoir at 47. The auxiliary reservoir is indicated as of the usual freight type with a brake cylinder 48 mounted on one end and the triple valve mounted on the other. However, instead of mounting the triple valve directly on the end of the reservoir, there is interposed between the body 14 of the triple valve and the seat on the end of the reservoir, a filler piece 49. This is formed with a passage 51 which connects the interior of the valve chamber bushing 18 with the interior of the auxiliary reservoir. It is also formed with a passage 52 which communicates with the brake cylinder pipe 53 (which, as usual, extends through the auxiliary reservoir 46) and with the brake cylinder passage 54 in the body 14.

The filler piece 49 is also provided with a connection 55 for the supplemental reservoir pipe 56, which, as clearly shown in Fig. 3, connects that with supplemental reservoir 47.

The lower body portion 13 of the triple valve is connected to the main body portion 14 by flanges and bolts, as clearly indicated in Fig. 3. Formed partly in each body member is a recess within which is mounted a housing 57. The particular construction of this housing and the manner of sealing the joints with the members 13 and 14, form the subject of a separate application for patent and is not claimed herein.

Briefly stated, the housing 57 seals at its lower end on a gasket 58, at its upper end on a gasket 59, and is provided at its middle with a flange which seals with a gasket 61, this gasket serving also to seal the joint between the members 13 and 14.

Mounted in the housing 57, and making a tight joint therewith by means of the gasket 62, is a member 63, cup-like in form and having a central hollow hub portion 64. The lower end of this member 64 is flanged, the flange seating on a portion of the housing 57 and being beveled on its lower side to serve as a seat for the diaphragm 65. The diaphragm is locked in position by a diaphragm seat ring 66, which is clamped in place by a ported nut 67 screwed into the lower end of the housing 57.

The lower end of the hub 64 carries a seat 68 for a pin valve 69, of usual form, which is mounted in the member 71 and confined by the member 72 into which member 71 is threaded. Members 71 and 72 are clamped to the diaphragm 65 and extend through the middle thereof. The construction of the pin valve is similar to that long used on steam pump governors and feed valves in the air brake art, and need not be described in detail beyond pointing out that the construction is such as to allow the pin valve to move laterally and aline itself with its seat 68. A coil spring 73 surrounds the hub 64 and acts in thrust downwardly against the member 71.

In the preferred construction, the strength of this spring is such that it will resist a differential pressure of 6 pounds per square inch between the pressures acting on opposite sides of the diaphragm 65.

The branch pipe 9 is connected through the union 15 and passage 74 with a drip cup 75, from which a passage 76 leads to the space within the housing 57 and thence through the aperture 77 to the space within the member 63 above the diaphragm 65. Consequently the diaphragm 65 is subject on its upper face to brake pipe pressure.

The passage 78 communicates with the pipe 56, and at its other end communicates with the space below the diaphragm 65, so that the diaphragm is subject on its lower face to the pressure in the supplemental reservoir 47. The function of the spring 73 is to hold the valve 69 normally open, but to permit it to close against its seat 68 whenever pressure in the brake pipe is a chosen amount below the pressure in the reservoir 47. The value 6 pounds per square inch is chosen for illustration, but is subject to variation within the scope of the invention.

The use of the spring 73 makes it possible to use a simple diaphragm 65 as an abutment, and avoids the necessity of using a differential diaphragm or piston, such as would otherwise be necessary to get the desired differential between brake pipe pressure and supplemental reservoir pressure. Any arrangement which would close the valve 69 when the desired differential existed between brake pipe and supplemental reservoir pressure, might be substituted, if preferred.

Remembering that the space above the diaphragm 65 is open to the brake pipe, the valve 69 controls flow from the brake pipe through the seat 68, thence through the hollow bore of the hub 64 to a passage 79. This passage is formed partly in the housing 57 and partly in the body members 13 and 14, and terminates in a quick service port 81 in the slide valve seat in the valve chamber bushing 18.

The brake pipe 15 communicates by way of passage 82 with the space to the left of the triple piston 31.

There is a second quick service port 83 in the slide valve seat and as shown in Fig. 1, this leads to the annular space 80 which surrounds the housing 57 and which communicates directly with the brake cylinder passage 54. In case it is desired to vent to atmosphere instead of to the brake cylinder in quick service, the construction shown in Fig. 2 may be adopted, in which the port 83a is substituted for the port 83 and leads to atmosphere, as shown.

84 is the brake cylinder exhaust port and leads by way of annular passage 85 around the valve chamber bushing to the retainer pipe 86. The retainer is not shown, but would be of any ordinary construction. The service port is shown at 87 and the emergency port at 88, and both communicate with a space 89 which leads by way of passage 91 to the brake cylinder passage 54. There is an independent exhaust port 92 in the slide valve seat, not controlled by the retainer. This port 92 is used to vent the supplemental reservoir in restricted release, as will be explained. The supplemental reservoir port appears at 93 and communicates directly with the pipe 56.

In quick service position the ports 81 and 83 register with ports 94 and 95 in the slide valve 41 and in this position these ports are connected by the quick service recess 96 in the lower face of the graduating valve 42. These ports are devoid of function in other positions of the valve.

There is a supplemental reservoir port 97 in the slide valve 41, which, in normal release position, registers with the supplemental reservoir port 93. Its upper end is controlled by the graduating valve 42, which, in the diagrammatic illustration of Fig. 1, is provided with a registering through port 98. The ports 97 and 98 function only in normal release position and permit flow in either direction between the supplemental and auxiliary reservoirs.

There is a recess 99 in the lower face of the slide valve. This serves as the exhaust port and is provided with a minute extension port, clearly shown in the drawing. In normal release position the recess 99 bridges the ports 84 and 87, permitting free exhaust of brake cylinder air. If the piston 31 moves into restricted recharge and release position, the minute extension registers with the port 84 and throttles the flow from the port 87 to the port 84. The throttling extension of the port 99 is clearly shown in the drawing, and as extensions of this sort are familiar to those skilled in the art, it is deemed unnecessary to confuse the drawing by the use of a reference character.

The service port in the valve 41 is shown at 101 and is controlled by the graduating valve 42. In quick service position the port 101 is just entering into register with the port 87 and is exposed at its upper end by the graduating valve 42. In full service position it is similarly exposed at its upper end, and is in full register with the port 87. In service lap position the piston moves inward so that the graduating valve 42 laps the port 101. The slide valve 42 may or may not move to carry the port 101 out of register with the port 87.

The emergency port is shown at 102. In emergency position this port registers with the port 88 and the port 93 is exposed by the end of the slide valve 41, so that air from the supplemental reservoir and from the auxiliary reservoir flows through the ports 102 and 88 to the brake cylinder. There is a bridging port 103 in the slide valve 41 which functions only in restricted release position and then serves to connect the port 93 with the port 92, permitting a restricted exhaust of supplemental reservoir pressure to atmosphere. The purpose is to bleed down the supplemental reservoir pressure about 10 pounds per square inch in restricted release so that if the auxiliary reservoir should be overcharged in restricted release, the excess pressure in the auxiliary reservoir will pass to the supplemental reservoir. In this way an undesired reapplication of the brakes at the termination of restricted release is prevented.

Operation

The restricted release and recharge characteristics of the valve will be readily understood, so that it seems unnecessary to describe the manipulations of the engineer's valve in release, or why the triple valves at the forward end of the train move to restricted release and recharge position, while those farther back in the train move to normal release and recharge position. The functions in the various positions will, however, be briefly described.

Restricted release and recharge

A high releasing pressure acting on the piston 31 will overpower the retard stop spring 45. Bead 35 will seat on bushing 18 and slot 36 will restrict the charging rate. At the same time the restricting extension of exhaust port 99 will throttle brake cylinder exhaust and the bridging port 103 will establish a slow exhaust of pressure from the supplemental reservoir 47.

Normal release following restricted release

When the triple valve moves from restricted release to normal release, its auxiliary reservoir may be partly charged, wholly charged, or overcharged. The supplemental reservoir will have been vented to a pressure about 10 pounds below its fully charged condition. When the valve moves to normal release position, the pressures in the two reservoirs will equalize, after which charging will continue if the equalized pressure be below normal brake pipe pressure.

Normal release

Valves which move in the first instance to normal release position will connect the supplemental reservoir with the auxiliary reservoir, so that the supplemental reservoir will partly charge the auxiliary reservoir. Should there be a tendency of the valve to move to application position at the end of long trains, where the rise of brake pipe pressure is slow, the throttling of port 97 by the graduating valve 42 will limit the feed back from the supplemental reservoir sufficiently to arrest the motion of the triple piston before quick service position is reached. In normal release and recharge position, brake cylinder pressure is quickly vented through exhaust recess 99.

Quick service

When the valve moves to quick service position, ports 94 and 95 register with ports 81 and 83, and are bridged by recess 96. Consequently brake pipe air is vented to the brake cylinder by way of passage 74, passage 76, aperture 77, through valve seat 68, port 79, ports 81, 94, recess 96, ports 95 and 83, space 80, and passage 54. As explained with reference to Fig. 2, the substitution of a port 83ᵃ leading to atmosphere, in lieu of the port 83, would result in quick service venting to atmosphere.

The venting of the brake pipe would continue as long as the triple valve remained in quick service position or until terminated by the closing of the valve 69. Valve 69 closes as soon as brake pipe pressure falls the chosen amount, assumed to be 6 pounds, below the pressure in the reservoir 47. As soon as this differential is established, quick service venting is permanently suspended until a new equalized relation between brake pipe pressure and supplemental reservoir pressure shall have been established.

It will be understood that when graduating button 32 engages graduating stem 22 without compressing spring 24, the quick service ports 94 and 95 are in full register with the quick service ports 81 and 83, and the service port 101 is in partial register with the seat port 87. The effect of outward motion of piston 31 against the resistance of the light graduating spring 24 is to throttle the quick service venting flow and increase service flow from the auxiliary reservoir to the brake cylinder. It is possible so to coordinate the tension of the spring 24 with the capacities of the quick service ports and the service port as to reduce the rate of quick service venting flow in any case where the cumulative effect of venting in a plurality of adjacent triple valves causes a drop in brake pipe pressure sufficient to threaten the operation of the emergency vent valve. Consequently, in the device shown in the drawing, the reduction in pressure produced through the quick service vents is limited in rate as well as in amount.

Quick service following recharge and release

If a service reduction of brake pipe pressure should be made while the triple valve is in normal release and recharge position, even during the continuance of charging flow, brake pipe pressure and supplemental reservoir pressure would be substantially equal. Consequently, the valve 69 would remain open and would not close until brake pipe pressure had been reduced the chosen amount, assumed to be 6 pounds below supplemental reservoir pressure.

Full service

In full service position, the port 101 registers with the port 87 and flow to the brake cylinder continues until port 101 is lapped by graduating valve 42.

Emergency position

If brake cylinder pressure is reduced a certain amount below equalization with the auxiliary reservoir (assumed to be 12 pounds below) the triple piston 31 will move to its outer limit of motion and seat against the gasket 29. This is known as emergency or over-reduction position, and is the position assumed by the parts when the vent valve 8 functions. In this position, air from both the reservoirs 46 and 47 flows to the brake cylinder by way of ports 102 and 88, the port 93 at this time being cleared by the valve 41.

General considerations

Experience has shown that by controlling the quick service vent port so as to prevent recurrent venting in a single application, it is possible to increase the capacities of the vent valves very greatly beyond the limits heretofore found practicable, without rendering the triple valve unstable.

While I prefer to use this mechanism in combination with a valve controlling the flow from two reservoirs, it is apparent that in the broadest aspects of the invention, it is possible to substitute for the supplemental reservoir, any space which is not drawn upon in service applications, and which in release position is in such communication with the brake pipe that pressures in the chamber and brake pipe tend to equalize.

In release, quick service, and service positions, the supplemental reservoir 47 responds strictly to this description. The quick service vent controlling valve is applicable to a wide range of specifically different triple valves, including those containing mechanism for controlling the rate of build-up of brake cylinder pressure in emergency, but in the interest of a ready understanding of the invention, it has here been described as applied to a valve of relatively simple construction.

The characteristic of controlling the flow between the supplemental reservoir and the auxiliary reservoir by means of the triple valve mechanism, and the characteristic of bleeding the supplemental reservoir in retarded release position, form a part of the claimed subject matter of my prior application Serial No. 517,604, filed February 21, 1931, and hence are not broadly claimed herein.

What is claimed is,—

1. The combination of a triple valve including quick service venting means; a normally open valve independent of the triple valve through which flow from said quick service venting means passes; and means responsive to a definite reduction of brake pipe pressure for closing said normally open valve.

2. The combination of a triple valve having a reservoir charging function and including a quick service brake pipe venting mechanism; a normally open valve through which the quick service brake pipe venting flow passes; and means responsive to the joint effect of brake pipe pressure and a pressure established by the charging function of said triple valve, for closing said normally open valve.

3. The combination with a triple valve of the type having a quick service brake pipe vent mechanism, of motor means conditioned by the charging function of the triple valve to respond directly to the initial portion of a service brake pipe pressure reduction, regardless of the state of charge at the commencement of the service reduction; and means for suspending the venting action of said vent mechanism, arranged to be actuated by such response of said motor means.

4. The combination of a brake pipe; an auxiliary reservoir; a brake cylinder; an automatic brake valve having a quick service vent which in quick service position of the automatic valve vents the brake pipe; a second valve controlling said quick service vent; an abutment operatively connected with said second valve and subject to brake pipe pressure in a valve opening direction; and yielding means urging said second valve in a closing direction.

5. The combination of a brake pipe; an auxiliary reservoir; a brake cylinder; an automatic brake valve having a quick service vent which in quick service position of the automatic valve vents the brake pipe to the brake cylinder; a second valve controlling said quick service vent; an abutment operatively connected with said second valve and subject to brake pipe pressure in a valve opening direction; and yielding means urging said valve in a closing direction.

6. The combination of a brake pipe; an auxiliary reservoir; a brake cylinder; an automatic brake valve having a quick service vent which in quick service position of the automatic valve vents the brake pipe to atmosphere; a second valve controlling said quick service vent; an abutment operatively connected with said second valve and subject to brake pipe pressure in a valve opening direction; and yielding means urging said valve in a closing direction.

7. The combination of a brake pipe; an auxiliary reservoir; a brake cylinder; an automatic brake valve having normal charging, quick service and service positions and having a quick service vent which in quick service position of the automatic valve vents the brake pipe; a second valve controlling said quick service port; a chamber connected with the brake pipe in normal charging position and disconnected therefrom in quick service and service positions; an abutment operatively connected with said second valve and subject in valve opening direction to brake pipe pressure and in a valve closing direction to pressure in said chamber; and means for biasing said second valve in an opening direction.

8. The combination of a brake pipe; an auxiliary reservoir; a brake cylinder; an automatic brake valve having normal charging, quick service and service positions, and having a quick service vent which in quick service position of the automatic valve vents the brake pipe to the brake cylinder; a second valve controlling said quick service port; a chamber connected with the brake pipe in normal charging position and disconnected therefrom in quick service and service positions; an abutment operatively connected with said second valve and subject in valve opening direction to brake pipe pressure and in a valve closing direction to pressure in said chamber; and means for biasing said second valve in an opening direction.

9. The combination of a brake pipe; an auxiliary reservoir; a brake cylinder; a triple valve having normal charging, quick service, and service positions, and having a quick service vent which in quick service position of the triple valve vents the brake pipe to atmosphere; a second valve controlling said quick service port; a chamber connected with the brake pipe in normal charging position and disconnected therefrom in quick service and service positions; an abutment operatively connected with said second valve and subject in valve opening direction to brake pipe pressure and in a valve closing direction to pressure in said chamber; and means for biasing said second valve in an opening direction.

10. The combination of a brake pipe; an auxiliary reservoir; a brake cylinder; a triple valve having normal charging, quick service, and service positions, and having a quick service vent which in quick service position of the triple valve vents the brake pipe; a second valve controlling said quick service port; a chamber connected with the brake pipe in normal charging position and disconnected therefrom in quick service and service positions; an abutment operatively connected with said second valve and subject to valve opening direction to brake pipe pressure and in a valve closing direction to pressure in said chamber; and a spring urging said second valve in an opening direction.

11. The combination of a brake pipe; an auxiliary reservoir; a supplemental reservoir; a brake cylinder; a triple valve having a quick service vent which in quick service position of the triple valve vents the brake pipe, said triple valve functioning in service position to connect the auxiliary reservoir to the brake cylinder, and in release position to connect both reservoirs with the brake pipe; a second valve controlling said quick service vent; an abutment operatively connected with said second valve, and subject in valve-closing direction to supplemental reservoir pressure and in valve opening direction to pressure in the brake pipe; and means for biasing said second valve in an opening direction.

12. The combination of a brake pipe; an auxiliary reservoir; a supplemental reservoir; a brake cylinder; a triple valve having a quick service vent, which in quick service position of the triple valve vents the brake pipe to the brake cylinder, said triple valve functioning in service position to connect the auxiliary reservoir to the brake cylinder, and in release position to connect both reservoirs with the brake pipe; a second valve controlling said quick service vent; an abutment operatively connected with said second valve, and subject in valve-closing direction to supplemental reservoir pressure and in valve-opening direction to pressure in the brake pipe; and means for biasing said second valve in an opening direction.

13. The combination of a brake pipe; an auxiliary reservoir; a supplemental reservoir; a brake cylinder; a triple valve having a quick service vent which in quick service position of the triple valve vents the brake pipe to atmosphere; said triple valve functioning in service position to connect the auxiliary reservoir to the brake cylinder, and in release position to connect both reservoirs with the brake pipe; a second valve controlling said quick service vent; an abutment operatively connected with said second valve, and subject in valve-closing direction to supplemental reservoir pressure and in valve-opening direction to pressure in the brake pipe; and means for biasing said second valve in an opening direction.

14. The combination of a brake pipe; an auxiliary reservoir; a supplemental reservoir; a brake cylinder; a triple valve having a quick service vent which in quick service position of the triple valve vents the brake pipe, said triple valve functioning in service position to connect the auxiliary reservoir to the brake cylinder, and in release position to connect both reservoirs with the brake pipe; a second valve controlling said quick service vent; an abutment operatively connected with said second valve, and subject in valve-closing direction to supplemental reservoir pressure and in valve-opening direction to pressure in the brake pipe; and a spring urging said second valve in an opening direction.

15. The combination with an automatic brake valve of the quick service type, said valve having quick service ports which register completely in quick service position and are out of register in full service position, and service ports which partially register in quick service position and fully register in full service position, of a graduating spring resisting the motion of the automatic valve from quick service to full service position, the strength of said spring and the arrangement of the ports being so coordinated as to throttle the quick service ports by motion of the automatic valve toward full service position if brake pipe pressure falls at an excessive rate; and means distinct from the automatic valve and responsive to the reduction of brake pipe pressure for suspending the quick service venting function.

16. The combination with a triple valve of the quick service type, said valve having quick service ports which register completely in quick service position and are out of register in full service position, and service ports which partially register in quick service position and fully register in full service position, of a graduating spring resisting the motion of the triple valve from quick service to full service position, the strength of said spring and the arrangement of the ports being so coordinated as to throttle the quick service ports by motion of the triple valve toward full service position if brake pipe pressure falls at an excessive rate; and means distinct from the triple valve and controlled by the fall of brake pipe pressure from the commencement of a service reduction thereof and serving to suspend the quick service venting action when brake pipe pressure has fallen a given amount.

17. The combination with a triple valve of the quick service type, said valve having quick service ports which register completely in quick service position and are out of register in full service position, and service ports which partially register in quick service position and fully register in full service position, of a graduating spring resisting the motion of the triple valve from quick service to full service position, the strength of said spring and the arrangement of the ports being so coordinated as to throttle the quick service ports by motion of the triple valve toward full service position if brake pipe pressure falls at an excessive rate; motor means conditioned by the charging function of the triple valve to respond to the initial portion of a service reduction regardless of the state of the charge at the commencement of the service reduction; and a valve controlling the quick service port and arranged to be closed by the response of said motor means when brake pipe pressure has been reduced a definite amount.

18. The combination of a brake pipe; an auxiliary reservoir; a brake cylinder; a triple valve having normal charging, quick service and full service positions, said valve including quick service ports which register fully in quick service position and which are out of register in full service position, and service ports which register partially in quick service position and register fully in full service position; a graduating spring resisting motion of the triple valve from quick service to full service position, said spring and the arrangement of the ports being so coordinated as to throttle the quick service port if brake pipe pressure falls at an unduly rapid rate; a second valve controlling said quick service port; a chamber; means associated with the triple valve for connecting said chamber with the brake pipe in normal charging position and disconnecting it therefrom in quick service and full service positions; an abutment operatively connected with said second valve and subject in valve-opening direction to brake pipe pressure and in valve-closing direction to pressure in said chamber; and means for biasing said second valve in an opening direction.

19. The combination of a brake pipe; an auxiliary reservoir; a brake cylinder; a triple valve having normal charging, quick service and full service positions, said valve including quick service ports which register fully in quick service position and which are out of register in full service position, and service ports which register partially in quick service position and register fully in full service position; a graduating spring resisting motion of the triple valve from quick service to full service position, said spring and the arrangement of the ports being so coordinated as to throttle the quick service port if brake pipe pressure falls at an unduly rapid rate; a second valve controlling said quick service port; a chamber; means associated with the triple valve for connecting said chamber with the brake pipe in normal charging position and disconnecting it therefrom in quick service and full service positions; an abutment operatively connected with said second valve and subject in valve-opening direction to brake pipe pressure and in valve-closing direction to pressure in said chamber; and a spring urging said second valve in an opening direction.

20. The combination of a brake pipe; an auxiliary reservoir; a brake cylinder; a triple valve having normal charging, quick service, full service and emergency positions, said valve including quick service ports which register fully in quick service position and which are out of register in full service position, and service ports which register partially in quick service position and register fully in full service position, a charging port which connects said reservoirs in normal charging position and emergency ports which connect both reservoirs with the brake cylinder in emergency position; a graduating spring resisting motion of said triple valve from quick service to full service position, said graduating spring, quick service and service ports being so coordinated that the quick service ports are throttled by motion of the triple valve if brake pipe pressure is reduced at an unduly rapid rate in service; a second valve controlling said quick service port; an abutment operatively connected with said second valve and subject in a valve-closing direction to supplemental reservoir pressure and in a valve-opening direction to pressure in the brake pipe; and means for biasing said second valve in an opening direction.

21. The combination with an automatic brake valve of the quick service type, said valve having quick service ports which register completely in quick service position and are out of register in full service position, and service ports which partially register in quick service position and fully register in full service position, of a graduating spring resisting the motion of the automatic valve from quick service to full service position, the strength of said spring and the arrangement of the ports being so coordinated as to throttle the quick service ports by motion of the automatic valve toward full service position if brake pipe pressure falls at an excessive rate.

22. The combination of a brake pipe; an auxiliary reservoir; a brake cylinder; an automatic brake valve having normal charging, quick service and service lap positions and having a quick service vent which in quick service position of the automatic valve vents the brake pipe; a second valve controlling said quick service vent; a chamber connected with the brake pipe in normal charging position and isolated in quick service and lap positions; an abutment operatively connected with said second valve and subject in valve opening direction to brake pipe pressure and in valve closing direction to pressure in said chamber; and means for biasing said second valve in an opening direction.

23. The combination of a brake pipe; an auxiliary reservoir; a brake cylinder; an automatic brake valve having normal charging, quick service and service lap positions and having a quick service vent which in quick service position of the automatic valve vents the brake pipe; a second valve controlling said quick service vent; a chamber connected with the brake pipe in normal charging position and isolated in quick service and lap positions; an abutment operatively connected with said second valve and subject in valve opening direction to brake pipe pressure and in valve closing direction to pressure in said chamber; and a spring serving to bias said second valve in an opening direction.

24. In a quick service mechanism, the combination of two valves connected in series and controlling a brake pipe vent, one valve being normally closed and the other valve normally open; means responsive to an initial reduction of brake pipe pressure for opening the first-named valve; and independent means responsive to a definite depression of brake pipe pressure for closing the second-named valve.

25. The combination with an automatic brake valve of the quick service type, said valve having quick service ports which register completely in quick service position and are out of register in full service position, and service ports which partially register in quick service position and fully register in full service position, of a graduating spring resisting the motion of the automatic valve from quick service to full service position, the strength of said spring and the arrangement of the ports being so coordinated as to throttle the quick service ports by motion of the automatic valve toward full service position if brake pipe pressure falls at an excessive rate; and pressure responsive valve means subject at least in part to brake pipe pressure and distinct from the automatic valve, for closing a quick service port in response to a definite lowering of brake pipe pressure.

CHARLES A. CAMPBELL.

CERTIFICATE OF CORRECTION.

Patent No. 2,034,328.  March 17, 1936.

CHARLES A. CAMPBELL.

It is hereby certified that error appears in the printed specification of the above numbered patent requiring correction as follows: Page 5, second column, line 33, claim 10, for "to" read in; and that the said Letters Patent should be read with this correction therein that the same may conform to the record of the case in the Patent Office.

Signed and sealed this 14th day of April, A. D. 1936.

(Seal)

Leslie Frazer
Acting Commissioner of Patents.